United States Patent [19]
Henrick et al.

[11] Patent Number: 5,999,598
[45] Date of Patent: Dec. 7, 1999

[54] METHOD AND SYSTEM FOR USED SELECTABLE QUALITY OF SERVICE OF FACSIMILE OF VOICE TRANSMISSIONS

[75] Inventors: Robert F. Henrick, Basking Ridge; Ajay K. Jain, Holmdel, both of N.J.

[73] Assignee: AT&T Corp, New York, N.Y.

[21] Appl. No.: 08/909,280

[22] Filed: Aug. 11, 1997

[51] Int. Cl.$^6$ .................................................. H04M 11/00
[52] U.S. Cl. ................................ 379/93.07; 379/100.01; 379/130
[58] Field of Search ........................... 379/93.07, 100.01, 379/100.09, 100.12, 100.14, 355, 130; 358/407, 440, 442

[56] References Cited

U.S. PATENT DOCUMENTS

| | | | |
|---|---|---|---|
| 5,033,079 | 7/1991 | Carton et al. ............................. | 379/100 |
| 5,127,047 | 6/1992 | Bell et al. . | |
| 5,237,428 | 8/1993 | Tajitsu et al. ............................ | 358/440 |
| 5,291,302 | 3/1994 | Gordon et al. ............................ | 358/407 |
| 5,377,017 | 12/1994 | Lam . | |
| 5,410,416 | 4/1995 | Amberg et al. . | |
| 5,739,919 | 4/1998 | Lee et al. ............................ | 379/100.01 |
| 5,802,281 | 9/1998 | Clapp et al. ......................... | 395/200.04 |
| 5,878,122 | 3/1999 | White et al. ............................ | 379/115 |
| 5,881,233 | 3/1999 | Toyoda et al. ............................ | 358/402 |

*Primary Examiner*—Curtis A. Kuntz
*Assistant Examiner*—Melur Ramakrishnaiah

[57] ABSTRACT

A system and method for transmitting a facsimile or voice transmission by an originating device over a telecommunications network by a selected one of a plurality of qualities of service. A local or first communication path is provided between the originating device and a double dialer and a network or second communication path is provided between the double dialer and a point of presence associated with a plurality of telecommunications networks, wherein each telecommunications network is identified by an indicator corresponding to a quality of service. A modified destination number having a destination telephone number and the indicator corresponding to the selected quality of service incorporated therein is transmitted from either the double dialer or the originating device to the point of presence. The outgoing facsimile is then routed over the local and network paths from the originating device to the point of presence. The point of presence subsequently transmits the facsimile or voice transmission to a destination device associated with the destination phone number over the telecommunications network corresponding to the selected one of the plurality of qualities of service. The system and method applies to the transmission of a facsimile message from a facsimile machine and the transmission of a voice message or real-time communication from a telecommunications handset.

48 Claims, 2 Drawing Sheets

METHOD AND SYSTEM FOR USED SELECTABLE QUALITY OF SERVICE OF FACSIMILE OF VOICE TRANSMISSIONS

BACKGROUND OF THE INVENTION

1. Field of the Invention

The present invention relates generally to telecommunications and, more particularly, to a method and system for allowing a user to select a quality of service and related cost of a facsimile or voice transmission at the time of transmittal.

2. Description of the Related Art

Today, facsimile machines are essential business communication tools that account for almost half of the traffic over an existing circuit switched network (e.g., public switched telephone network ("PSTN")) during peak busy hours. Unfortunately, heavy traffic in the network causes congestion, creating problems such as noisy or bad connections resulting in dropped calls between the originating or transmitting facsimile machine and the destination facsimile machine. In such cases, the originating facsimile machine will typically store the facsimile and attempt to transmit the facsimile several times until it is successful, resulting in extended sessions or, in some cases, multiple long distance toll calls. Although facsimiles may be delivered in real time over a low latency network such as the Internet, during times of congestion, it may be impossible to successfully transmit the facsimile in the times required by the facsimile protocols to deliver the facsimile in real time. Hence, many Internet based solutions may be based on, or fall back to, store and forward solutions. Furthermore, transmitting a facsimile during peak busy hours is far more costly than transmitting the facsimile during non-peak hours, such as late in the evening.

Currently, all facsimiles are sent via the same means and with the same priority. However, with the advent of private digital networks, much of the traffic over the existing network may be transferred to the digital networks to overcome the problems described above with respect to facsimile quality of service. Quality of service is related to both the quality of the transport and the timeliness of the facsimile. An example of an enhanced digital network is Enhanced Facsimile Service offered by AT&T where international conventional facsimile traffic is sent over separate international trunks which are closely monitored to maintain superior facsimile quality relative to standard PSTN traffic. An example of the use of a digital packet network is the AT&T EasyLink facsimile service, where facsimiles are accepted for delivery locally, and transmitted in a store and forward mode for later guaranteed delivery at a reduced cost over the PSTN facsimile.

Access to a digital packet network such as EasyLink Service is usually by the facsimile machine connecting to a local Point of Presence ("POP") for the selected digital network service provider. Through signaling via Dual Tone Multi-Frequency ("DTMF"), either manually or through the use of an automatic double dialer, the user provides an account number and a destination facsimile number. With Enhanced Facsimile Service, the user places an additional digit (e.g., "0") after a country code of the destination facsimile number to identify the service. The facsimile is transmitted at that time over the private network to the destination facsimile machine. The user is billed on a per minute basis for the time required to transmit the facsimile.

Currently, the use of existing circuit switched networks such as the PSTN provide low latencies required for a real time facsimile. Packet network delivery may be significantly less expensive due to the exemption from settlement and access fees, but cannot currently provide guarantees of low latencies that the PSTN provides. Furthermore, service providers may discount traffic delayed to off peak hours to encourage more efficient use of their networks. Thus, there exist multiple quality of services that are priced at corresponding rates. For example, a user in Japan may select AT&T Enhanced Fax to immediately deliver an important document to the United States that will be discussed as part of a phone call on that day, but at all other times the user only needs to deliver a facsimile overnight at a significantly reduced cost. Hence, a need exists to select the network and/or quality of service at the time of transmittal of each facsimile.

SUMMARY OF THE INVENTION

Thus, an object of the present invention is to provide a method and system for allowing a user to select the quality of service desired and the related cost of a facsimile or voice transmission, e.g., a facsimile message, voice message or real-time voice communication, at the time of transmittal. The present invention accomplishes this and other objects of the invention and overcomes the problems associated with the prior art through the use of a modified destination number ("MDN") having a user selected quality of service and a destination phone number incorporated therein. The MDN is either dialed manually by the user or automatically by means of a double dialer and is transmitted from an originating facsimile machine or handset to a network POP using DTMF numbers. The POP decodes the MDN and routes the facsimile or voice transmission to the appropriate telecommunications network associated with the quality of service selected.

In accordance with the present invention, a system and method for transmitting a facsimile or voice transmission by an originating device over a telecommunications network by a selected one of a plurality of qualities of service comprises a local or first communication path being provided between the originating device and a double dialer (the "local path") and a network or second communication path (the "network path") between the double dialer and a POP associated with a plurality of telecommunications networks, wherein each telecommunications network is identified by an indicator corresponding to a quality of service. The MDN having the destination telephone number and the indicator corresponding to the selected quality of service is transmitted from either the double dialer or the originating device to the POP. The outgoing facsimile or voice transmission is then routed over the local and network paths from the originating device to the POP. The POP subsequently routes the facsimile or voice transmission to a destination device associated with the destination phone number over the telecommunications network with selected priorities corresponding to the selected one of the plurality of qualities of service. The POP can then monitor the various networks that it has access to and transmit the facsimile or voice transmission to meet the user's demand.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. For example, although the present invention is described with respect to the transmission of facsimile messages, it is understood that the present invention is also applicable to the transmission of voice messages or real-time voice communications. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DETAILED DESCRIPTION

Figure 1:
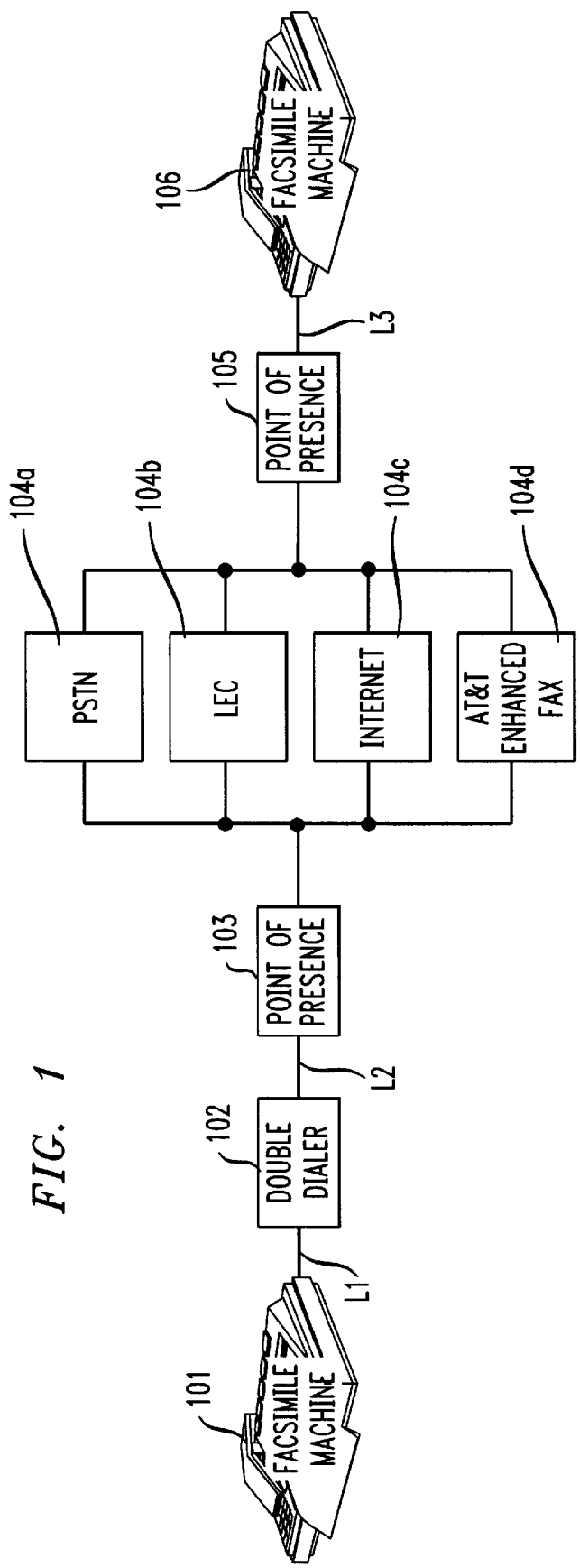
FIG. 1 is a block diagram of a telecommunications system for implementing the present invention.

FIG. 1 is a block diagram of an illustrative facsimile telecommunications system. Two facsimile machines are illustrated in FIG. 1; an originating facsimile machine 101 from which a facsimile message may be transmitted and a destination facsimile machine 106 for receiving the transmitted facsimile message.

While only two facsimile machines are shown in FIG. 1 for illustrative purposes, it is understood that a typical facsimile telecommunications system would generally comprise a greater number of facsimile machines. It is also understood that the originating facsimile machine 101 is also capable of receiving facsimile messages over the facsimile telecommunications system and that the destination facsimile machine 106 is also capable of transmitting facsimile messages over the telecommunications system.

As is illustrated in FIG. 1, the originating and destination facsimile machines 101, 106 are interconnected via telecommunications lines or paths by one of multiple telecommunications networks 104a, 104b, 104c and 104d which may be, for example, a PSTN, a local exchange carrier ("LEC") telecommunications network, a private or public packet switched telecommunications network (e.g., the Internet or Intranet), other digital packet telecommunications network or a combination thereof. Access to the telecommunications networks 104a, 104b, 104c and 104d by the facsimile machines 101, 106 may be accomplished by connecting the originating facsimile machine 101 via a network communication path $L_2$ to a POP 103 for a telecommunications network service provider and connecting the destination facsimile machine 106 via a network communication path $L_3$ to a local POP 105 for a telecommunications network service provider associated with the telecommunications network 104a, 104b, 104c or 104d.

In accordance with the present invention, the user may select the quality of service for transmission of a facsimile message, i.e., the appropriate telecommunications network 104a, 104b, 104c or 104d over which the facsimile message is transmitted from the POP 103 and the quality of service desired in that network. Sample grades of quality of service include: standard PSTN, Enhanced PSTN, store and forward, store and forward overnight and a less reliable network (e.g., the Internet for transmitting a facsimile or transmitting a voice call). The quality of service that the user selects for transmitting the facsimile is represented by a number representing a quality of service indicator that is incorporated along with a destination phone number within an MDN, discussed below.

A preferred POP 103, 105 for use with the present invention is one based on using facsimile boards, computer servers and routers commercially available from any of a number of organizations, such as Arel Communications, Netcentric or NetExchange. The POPs 103, 105 can provide a demodulation and remodulation of the facsimile traffic for efficient transfer over a digital network. They may also simply pass the received signal to a selected network, for example choosing between the standard PSTN Trunks and the Enhanced Fax Trunks. The typical bandwidth of a facsimile transmission is 9600 BAUD so that demodulation from the analog modem signal and packetization can provide greater efficiencies in communication than utilizing a 64 kilobit per second PSTN circuit. Remodulation of the digital signal into the facsimile modem protocol may be required for the POP 105 to complete the call over network communication path $L_3$. In accordance with the present invention, POP 103 is preferably modified in a manner known to those skilled in the art to automatically select a quality of service depending on a default selection made by the user. The POP 103 will also be modified to provide voice prompts to the user to instruct the user to manually dial or select the number representing the quality of service indicator into the originating facsimile machine 101 in the absence of a double dialer. Accordingly, the POP 103 must also be modified to include voice recognition to receive the voice response to the voice prompts from the user. Finally, the POP 103 will be modified to accept and decode the MDN when entered automatically by the double dialer. Thus, when the MDN is encountered, the POP 103 will route the facsimile over the appropriate network with the appropriate priority.

It is understood that either or both facsimile machines 101, 106 may be behind a private branch exchange (PBX) and/or other telecommunications switching system (e.g., LEC telecommunications network). In this case, the network communication paths $L_2$ and $L_3$ represent internal PBX circuits and connect via a local POP 103, 105 to an external long haul network 104a, 104b, 104c or 104d. For simplicity and illustrative purposes, however, a separate PBX or other telecommunications switching system is not shown in FIG. 1.

The international standards for facsimile transmission are established by the International Telegraph and Telephone Constructive Committee (CCITT), and have been published, for instance, in the CCITT Red Book recommendations T.4, T.5, T.6 and T.30, and in the CCITT Blue Book recommendation T.563. These CCITT standards are well known and will not be discussed in detail.

An automatic double dialer 102 is preferably provided between the originating facsimile machine 101 and the POP 103. The double dialer 102 preferably comprises a DTMF generator or pulse dialer that serves to connect the originating facsimile machine 101 to the POP 103 over a local or first communication path $L_1$ by automatically dialing the appropriate telephone number to access the POP 103. The double dialer 102 is preferably a conventional digital double dialer that comprises a microprocessor that can be adapted or preprogrammed to automatically create an MDN in accordance with the present invention. There are several methods in which the double dialer 102 can be preprogrammed to establish the MDN. One method is to replace digits in the normal destination phone number, such as replacing the "011" in international calls with "999" to represent the highest quality of service. Another method is to add digits representing the quality of service to the destination phone number, e.g., adding a "1" to the end of a number represents the highest quality of service.

Figure 2:
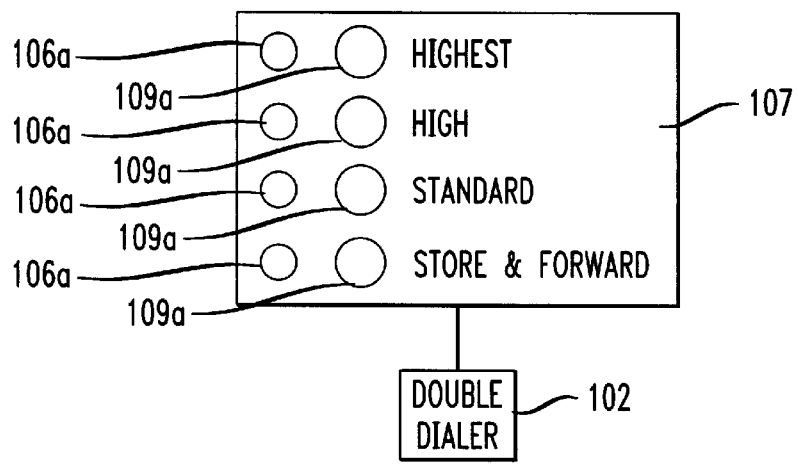
FIG. 2 is a block diagram of a double dialer having a user interface unit for implementing a preferred embodiment of the present invention.

As illustrated in FIG. 2, the double dialer 102 may also be modified in a manner known to those skilled in the art to include a user interface unit 107 adapted for a user to select the quality of service and wherein the double dialer 102 automatically formulates the MDN to include the received destination phone number and the number representing the quality of service indicator according to the user selection as received from the user interface unit 107. With the user interface unit 107, the user selects between the different qualities of service by pressing one of the function keys 109a, 109b, 109c or 109d corresponding to the selected quality of service and a corresponding LED light 108a, 108b, 108c or 108d lights up in response to indicate the selection. A preferred double dialer 102 for use with the present invention is a modification of the PAV Call Control Product Line commercially available from Mitel Enterprises.

Figure 3:
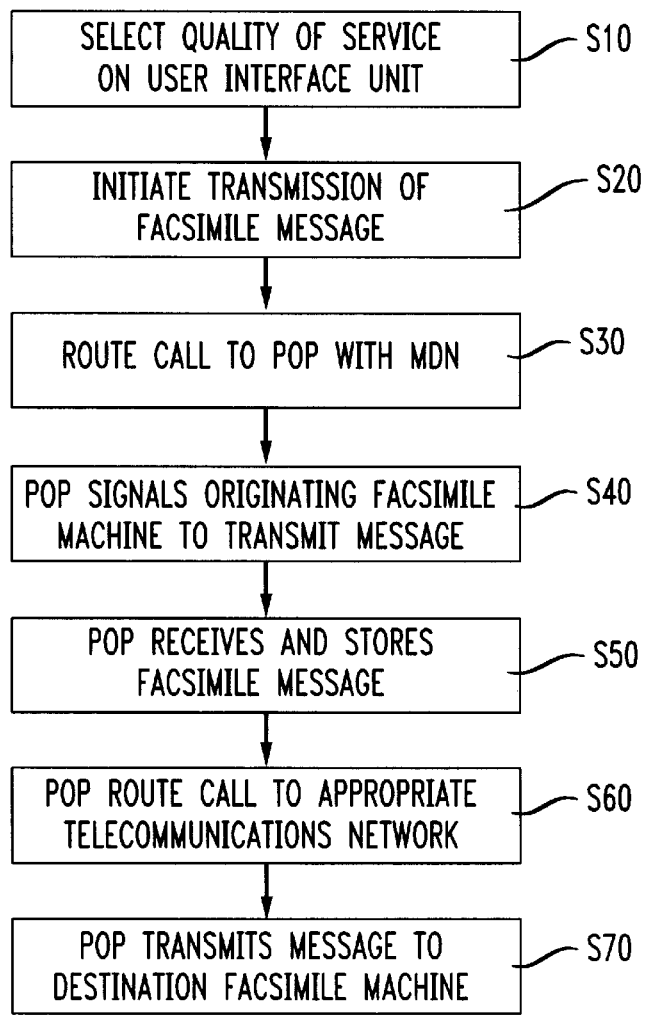
FIG. 3 is a flow diagram illustrating the operation of the preferred embodiment of the present invention.

Referring now to FIG. 3, the manner in which the preferred embodiment of the present invention operates is described as follows. In step S10, the sender or operator of the originating facsimile machine 101 selects a quality of service by pressing one of the function keys 109a, 109b, 109c or 109d on the double dialer 102, to select either "highest," "high," "standard" or "store and forward" quality of service, respectively. The LED light 108a, 108b, 108c or 108d associated with the quality of service lights up to mark the selection. In step S20, the sender initiates the transmission of a facsimile message in a conventional manner by placing the document(s) to be faxed in the document feeder of the originating facsimile machine 101 and dialing or programming the facsimile machine 101 to dial the telephone number associated with the destination facsimile machine 106. The double dialer 102 intercepts the dialed telephone number, and using the intercepted telephone number, the double dialer 102 formulates the MDN incorporating the number representing the user selected quality of service indicator and the intercepted telephone number. In step S30, the double dialer 102 then dials a separate telephone number associated with the POP 103 to route the call along with the MDN to the facsimile service facility provided by the network service provider. In addition to routing the facsimile call to the POP 103 for processing by the network service provider, the double dialer 102 also transmits the automatic number or account number associated with the originating facsimile machine 101, and any other required data to the POP 103 for further processing by the network service provider.

Once the connection is made between the originating facsimile machine 101 and the POP 103 via the double dialer, the POP 103 signals the originating facsimile machine 101 to transmit the facsimile message to the POP 103 over the local and network communication paths $L_1$ and $L_2$ (step S40). The POP 103 or associated adjunct controlling the facsimile service then receives the facsimile message from the originating facsimile machine 101 through a modem associated with the POP 103, demodulates and packetizes the facsimile message and stores the facsimile message and associated data in a corresponding database for subsequent transmission to the destination facsimile machine 106 (step S50). Preferably, the POP 103 also handles billing, call control and addressing. The POP 103 decodes the received MDN to determine which quality of service the user has selected and the destination telephone number, and routes the call over the appropriate telecommunications network 104 to the destination facsimile machine 106 based on the quality of service selected in step S60. If the "store and forward" quality of service was selected, the POP 103 will wait until the predetermined time before routing the call. The POP 103 transmits the packetized facsimile message for delivery to the destination facsimile machine 106 over the telecommunications network 104a, 104b, 104c or 104d in step S70.

In an alternative embodiment of the present invention, the double dialer 102 does not comprise a user interface unit 107, and the user manually enters a MDN incorporating the destination telephone number and the number representing the quality of service indicator into the double dialer 102. The double dialer 102 then transmits the MDN to the POP 103 in the same manner described above.

In another alternative embodiment of the present invention, the user does not have a double dialer 102. After the POP 103 receives the destination phone number from the user, the POP 103 provides the user with voice prompts instructing the user to manually enter in the number representing the quality of service indicator (e.g., DTMF digit or voice response). The number is then passed from the originating facsimile machine 101 to the POP 103, and the transaction proceeds in generally the same manner described above.

In yet another alternative embodiment of the present invention, the POP 103 has a different access telephone number associated with each quality of service available. The double dialer 102 is preprogrammed to receive the number representing quality of service and to automatically dial the access telephone number associated with the quality of service or directly place the phone call. In this embodiment, the double dialer 102 does not create a MDN and the POP 103 does not have to be preprogrammed to decode the MDN.

In yet another alternative embodiment of the present invention, the functionality of the double dialer 102 is incorporated directly into the facsimile machine 101. In other words, the functionality of the invention is included in the facsimile machine 101 wherein the interface is incorporated into the facsimile machine 101 through the use of hard buttons or soft buttons incorporated with a screen interface.

In yet another embodiment of the present invention, the double dialer 102 is either placed adjacent to a private branch exchange (PBX) or incorporated therein.

Although the present invention is described with respect to transmission of facsimile messages, it is understood that the present invention is also applicable to transmission of voice calls, e.g., voice messages and real-time voice communications. In the context of the real-time voice communication, the user would have the option of selecting between the quality of the voice network and whether to send a message in lieu of a direct connect. For example, the user could desire a PSTN voice call or an Internet call. Alternately, a voice message to be delivered in non-real time may meet the user's telecommunications needs.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A method for transmitting a facsimile or voice transmission by an originating device over a telecommunications network having one or more qualities of service, comprising the steps of:
   providing a first communication path between the originating device and a double dialer;
   selecting by a user a desired quality of service corresponding to a particular telecommunications network;
   providing a second communication path between the double dialer and a point of presence associated with a plurality of telecommunications networks, each of the telecommunications networks identified by an indicator corresponding to a quality of service;
   transmitting a modified destination number having a destination telephone number and the indicator corresponding to the selected quality of service incorporated therein to the point of presence;
   routing the facsimile or voice transmission over the first and second communication paths from the originating device to the point of presence; and
   transmitting the facsimile or voice transmission to a destination device associated with the destination telephone number over the telecommunications network identified by the indicator corresponding to the selected quality of service.

2. The method of claim 1, wherein the double dialer comprises a user interface unit and the step of transmitting the modified destination number further comprises the steps of:
   providing the selected quality of service to the user interface unit;
   retrieving the indicator corresponding to the selected quality of service; and
   formulating the modified destination number.

3. The method of claim 2, wherein the user interface unit comprises a plurality of function keys, each function key representing the indicator corresponding to the quality of service, wherein the step of providing further comprises the step of pressing one of the plurality of function keys.

4. The method of claim 1, further comprising the step of storing the facsimile or voice transmission in a memory associated with the point of presence.

5. The method of claim 4, wherein the stored facsimile or voice transmission is transmitted at a predetermined time.

6. The method of claim 1, wherein the step of routing the facsimile or voice transmission over the first and second communications paths comprises the step of redirecting the facsimile or voice transmission to the point of presence by dialing a preprogrammed number associated with the point of presence.

7. The method of claim 6, wherein the point of presence is associated with a plurality of preprogrammed numbers, each preprogrammed number being associated with one of the telecommunications networks.

8. The method of claim 1, wherein the step of transmitting the facsimile or voice transmission further comprises the step of selecting the telecommunications network corresponding to a predetermined default selection.

9. The method of claim 1, wherein one of the plurality of telecommunication networks comprises a standard public switched telephone network.

10. The method of claim 1, wherein one of the plurality of telecommunications networks comprises an enhanced public switched telephone network.

11. The method of claim 1, wherein one of the plurality of telecommunications networks comprises the Internet.

12. The method of claim 1, wherein the quality of service comprises store and forward service.

13. The method of claim 1, wherein the destination telephone number comprises a plurality of digits and the step of transmitting the modified destination number further comprises the step of replacing at least one of the plurality of digits in the destination phone number with the indicator to formulate the modified destination number.

14. The method of claim 1, wherein the step of transmitting the modified destination number further comprises the step of adding the indicator to the destination phone number to formulate the modified destination number.

15. The method of claim 1, wherein the step of transmitting the modified destination number further comprises the step of manually providing the modified destination number to the double dialer.

16. The method of claim 1, wherein the double dialer is associated with a private branch exchange.

17. The method of claim 1, wherein the originating device is a facsimile machine and the facsimile or voice transmission is a facsimile message.

18. The method of claim 1, wherein the originating device is a telecommunications handset and the facsimile or voice transmission is a voice message or voice real-time communication.

19. A method for transmitting a facsimile or voice transmission by an originating device over a telecommunications network having one or more qualities of service, comprising the steps of:
   providing a communication path between the originating device and a point of presence associated with a plurality of telecommunications networks, each of the telecommunications networks identified by an indicator corresponding to a quality of service;
   selecting by a user a desired quality of service corresponding to a particular telecommunications network;
   transmitting a destination telephone number to the point of presence;
   providing a voice prompt to the user from the point of presence over the communication path instructing the user to transmit the indicator corresponding to the selected quality of service;
   routing the facsimile or voice transmission from the originating device to the point of presence; and
   transmitting the facsimile or voice transmission to a destination device associated with the destination telephone number over the telecommunications network identified by the indicator corresponding to the selected quality of service.

20. The method of claim 19, wherein the originating device is a facsimile machine and the facsimile or voice transmission is a facsimile message.

21. The method of claim 19, wherein the originating device is a telecommunications handset and the facsimile or voice transmission is a voice message or voice real-time communication.

22. A method for transmitting a facsimile or voice transmission by an originating device over a telecommunications network having one or more qualities of service, comprising the steps of:
   providing a communication path between the originating device and a point of presence associated with a plurality of telecommunications networks, each of the telecommunications networks identified by an indicator corresponding to a quality of service;

selecting by a user a desired quality of service corresponding to a particular telecommunications network;

transmitting a modified destination number having a destination telephone number and the indicator corresponding to the selected quality of service incorporated therein from the originating device to the point of presence;

routing the facsimile or voice transmission over the communication path from the originating device to the point of presence; and transmitting the facsimile or voice transmission to a destination device associated with the destination telephone number over the telecommunications network identified by the indicator corresponding to the selected quality of service.

23. The method of claim 22, wherein the originating device is a facsimile machine and the facsimile or voice transmission is a facsimile message.

24. The method of claim 22, wherein the originating device is a telecommunications handset and the facsimile or voice transmission is a voice message or voice real-time communication.

25. A system for transmitting a facsimile or voice transmission from an originating device to a destination device over a telecommunications network identified by an indicator corresponding to a user selected quality of service, comprising:

a double dialer interconnected with the originating device by a first communication path, wherein the double dialer receives the facsimile or voice transmission from the originating device over the first communication path; and a point of presence associated with a plurality of telecommunications networks, each of the telecommunications networks identified by an indicator corresponding to a quality of service, the point of presence being interconnected with the double dialer by a second communication path;

wherein the double dialer transmits the facsimile or voice transmission and a modified destination number over the second communication path to the point of presence, the modified destination number comprising a destination telephone number and the indicator corresponding to the user selected quality of service; and wherein the point of presence transmits the facsimile or voice transmission to the destination device associated with the destination telephone number over the telecommunications network corresponding to the user selected quality of service.

26. The system of claim 25, wherein the double dialer comprises a user interface unit configured to receive the user selected quality of service, retrieve the indicator corresponding to the user selected quality of service and formulate the modified destination number.

27. The system of claim 26, wherein the user interface unit comprises a plurality of function keys, each function key representing the indicator corresponding to a particular quality of service.

28. The system of claim 25, wherein the point of presence further comprises a memory for storing the facsimile or voice transmission.

29. The system of claim 28, wherein the stored facsimile or voice transmission is transmitted at a predetermined time.

30. The system of claim 25, wherein the double dialer transmits the facsimile or voice transmission to the point of presence by dialing a preprogrammed number associated with the point of presence.

31. The system of claim 30, wherein the point of presence is associated with a plurality of preprogrammed numbers, each preprogrammed number being associated with one of the telecommunications networks.

32. The system of claim 25, wherein one of the plurality of telecommunications networks corresponds to a predetermined default selection.

33. The system of claim 25, wherein one of the plurality of telecommunications networks comprises a standard public switched telephone network.

34. The system of claim 25, wherein one of the plurality of telecommunications networks comprises an enhanced public switched telephone network.

35. The system of claim 25, wherein one of the plurality of telecommunications networks comprises the Internet.

36. The system of claim 25, wherein the quality of service comprises store and forward service.

37. The system of claim 25, wherein the destination telephone number comprises a plurality of digits and the double dialer is further configured to replace at least one of the plurality of digits in the destination phone number with the indicator to formulate the modified destination number.

38. The system of claim 25, wherein the double dialer is further configured to add the indicator to the destination phone number to formulate the modified destination number.

39. The system of claim 25, wherein the double dialer is configured to manually receive the modified destination number.

40. The system of claim 25, wherein the double dialer is associated with a private branch exchange.

41. The system of claim 25, wherein the originating device is a facsimile machine and the facsimile or voice transmission is a facsimile message.

42. The system of claim 25, wherein the originating device is a telecommunications handset and the facsimile or voice transmission is a voice message or voice real-time communication.

43. A system for transmitting a facsimile or voice transmission from an originating device to a destination device over a telecommunications network identified by an indicator corresponding to a user selected quality of service, comprising:

a point of presence associated with a plurality of telecommunications networks, each of the telecommunications networks identified by an indicator corresponding to a particular quality of service, the point of presence being interconnected with the originating device by a communication path;

wherein the originating device transmits the facsimile or voice transmission and a destination telephone number over the communication path to the point of presence;

wherein the point of presence provides a voice prompt to the user over the communication path instructing the user to transmit the indicator corresponding to the user selected quality of service; and wherein the point of presence transmits the facsimile or voice transmission to the destination device associated with the destination telephone number over the telecommunications network corresponding to the user selected quality of service.

44. The system of claim 43, wherein the originating device is a facsimile machine and the facsimile or voice transmission is a facsimile message.

45. The system of claim 43, wherein the originating device is a telecommunications handset and the facsimile or voice transmission is a voice message or voice real-time communication.

46. A system for transmitting a facsimile or voice transmission from an originating device over a telecommunications network identified by an indicator corresponding to a user selected quality of service, comprising:

a point of presence associated with a plurality of telecommunications networks, each of the telecommunications networks identified by an indicator corresponding to a quality of service, the point of presence being interconnected with the originating device by a communication path;

wherein the originating device transmits a modified destination number comprising a destination telephone number and the indicator corresponding to the user selected quality of service incorporated therein and routes the facsimile or voice transmission to the point of presence;

wherein the point of presence transmits the facsimile or voice transmission to the destination device associated with the destination telephone number over the telecommunications network corresponding to the user selected quality of service.

47. The system of claim 46, wherein the originating device is a facsimile machine and the facsimile or voice transmission is a facsimile message.

48. The system of claim 46, wherein the originating device is a telecommunications handset and the facsimile or voice transmission is a voice message or voice real-time communication.

* * * * *